United States Patent [19]
Hofmann

[11] Patent Number: 5,117,908
[45] Date of Patent: Jun. 2, 1992

[54] METHOD AND EQUIPMENT FOR OBTAINING ENERGY FROM OIL WELLS

[75] Inventor: Heinrich Hofmann, Worms, Fed. Rep. of Germany

[73] Assignee: KSB Aktiengesellschaft, Frankenthal, Fed. Rep. of Germany

[21] Appl. No.: 585,124

[22] PCT Filed: Mar. 13, 1989

[86] PCT No.: PCT/EP89/00264
§ 371 Date: Sep. 28, 1990
§ 102(e) Date: Sep. 28, 1990

[87] PCT Pub. No.: WO89/09323
PCT Pub. Date: Oct. 5, 1989

[30] Foreign Application Priority Data
Mar. 31, 1988 [DE] Fed. Rep. of Germany ....... 3810951

[51] Int. Cl.$^5$ ................................. E21B 43/36
[52] U.S. Cl. ................................. 166/267; 166/66.4; 166/75.1; 166/357; 166/369; 290/43; 417/350; 417/391; 417/392
[58] Field of Search ............ 166/75.1, 66.4, 104, 166/267, 357, 369; 290/43, 52, 54; 60/398, 419, 485; 417/334, 335, 348, 350, 390-393, 408, 442

[56] References Cited

U.S. PATENT DOCUMENTS

| | | | |
|---|---|---|---|
| 3,523,192 | 8/1970 | Lang | 290/43 |
| 4,134,024 | 1/1979 | Wiseman | 290/52 |
| 4,248,305 | 2/1981 | Scarbrough | 166/305 |
| 4,273,189 | 6/1981 | Carpenter | 166/266 |
| 4,369,373 | 1/1983 | Wiseman | 290/43 |
| 4,848,471 | 7/1989 | Bencze | 166/369 |

FOREIGN PATENT DOCUMENTS

| | | | |
|---|---|---|---|
| 144091 | 1/1962 | U.S.S.R. | 166/369 |
| 1140015 | 1/1969 | United Kingdom | 166/267 |

*Primary Examiner*—Hoang C. Dang
*Attorney, Agent, or Firm*—Peter K. Kontler

[57] ABSTRACT

Pressurized petroleum flows from a well into a turbine. The petroleum undergoes a pressure reduction in the turbine and then enters a separation chamber where it is separated into liquid and gaseous phases. The liquid phase is sent to a pump which serves to transfer the liquid phase to a station remote from the well. Similarly, the gaseous phase is directed to a compressor which functions to transfer the gaseous phase to a station remote from the well. The pump and the compressor are coupled to the turbine which uses the energy liberated by the petroleum during pressure reduction to drive the pump and the compressor.

14 Claims, 6 Drawing Sheets

Prior Art Fig. 1

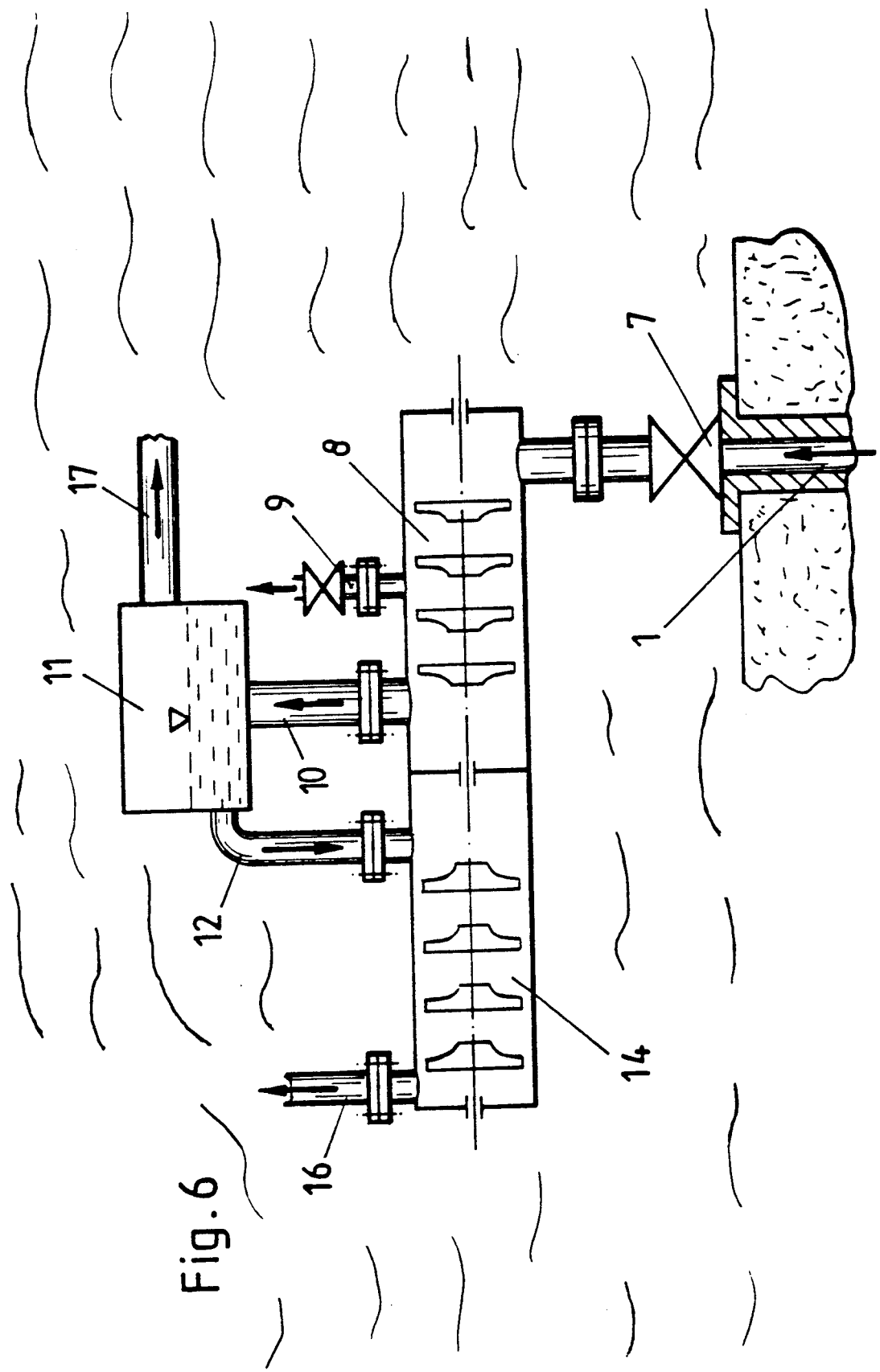

METHOD AND EQUIPMENT FOR OBTAINING ENERGY FROM OIL WELLS

BACKGROUND OF THE INVENTION

The invention relates to a method for obtaining energy from wells yielding gas containing petroleum and more especially from submarine wells, and to equipment for performing the method.

Petroleum wells differ substantially as regards their product and the conditions of production. More importantly, there are differences as regards proportions of petroleum and natural gas and the pressure of the product from the well. The parameters relating to the product however vary during the course of operation of the well. These facts have to be taken into account carefully, more especially in the case of submarine wells, since it is hard to obtain access to the drilled well itself.

In the case of oil wells with a gage pressure it has so far been conventional to separate the product consisting of oil and gas, into its components on a platform arranged above the level of the sea. That is to say it is separated on such an offshore platform in a gas separation operation involving non-energetic pressure reduction.

Since it is not generally possible to assume that the underground pressure will be maintained during the entire time of production from the well sufficiently to convey the product to an offshore platform or to a station on shore it was necessary to devise a new method of production from submarine sources, in accordance with which the excess pressure at the well is reduced in a valve and the transport of the oil to the land takes place by driven machinery. The product may be transported just as it comes from the well, that is to say without separation into its components ("multiphase flow") or after separation into oil and gas ("single phase flow"), pumps being used for mixed products and for petroleum while for natural gas compressors are used.

The fact that in this system a large amount of electrical energy is required for the driven machinery involves high costs. It is also to be taken into account that the electrical power has to be supplied through heavy cables in view of the large amount of such power needed.

SUMMARY OF THE INVENTION

One object of the present invention is to substantially simplify and cheapen the provision of energy as required for the operation of the driven machinery.

Taking as a starting point the fact that the product coming from the well is in many cases under gage pressure which has to be reduced at the latest by the time of separation of the well product into its components, the invention attains its object by providing for a reduction in pressure of the well product in a device which is able to utilize the liberated energy.

BRIEF DESCRIPTION OF THE DRAWINGS

The invention will now be further explained with reference to working examples thereof as shown in the drawing.

FIG. 6 is a view of a modified form of the equipment shown in FIG. 3.

DESCRIPTION OF THE PREFERRED EMBODIMENTS

Figure 1:
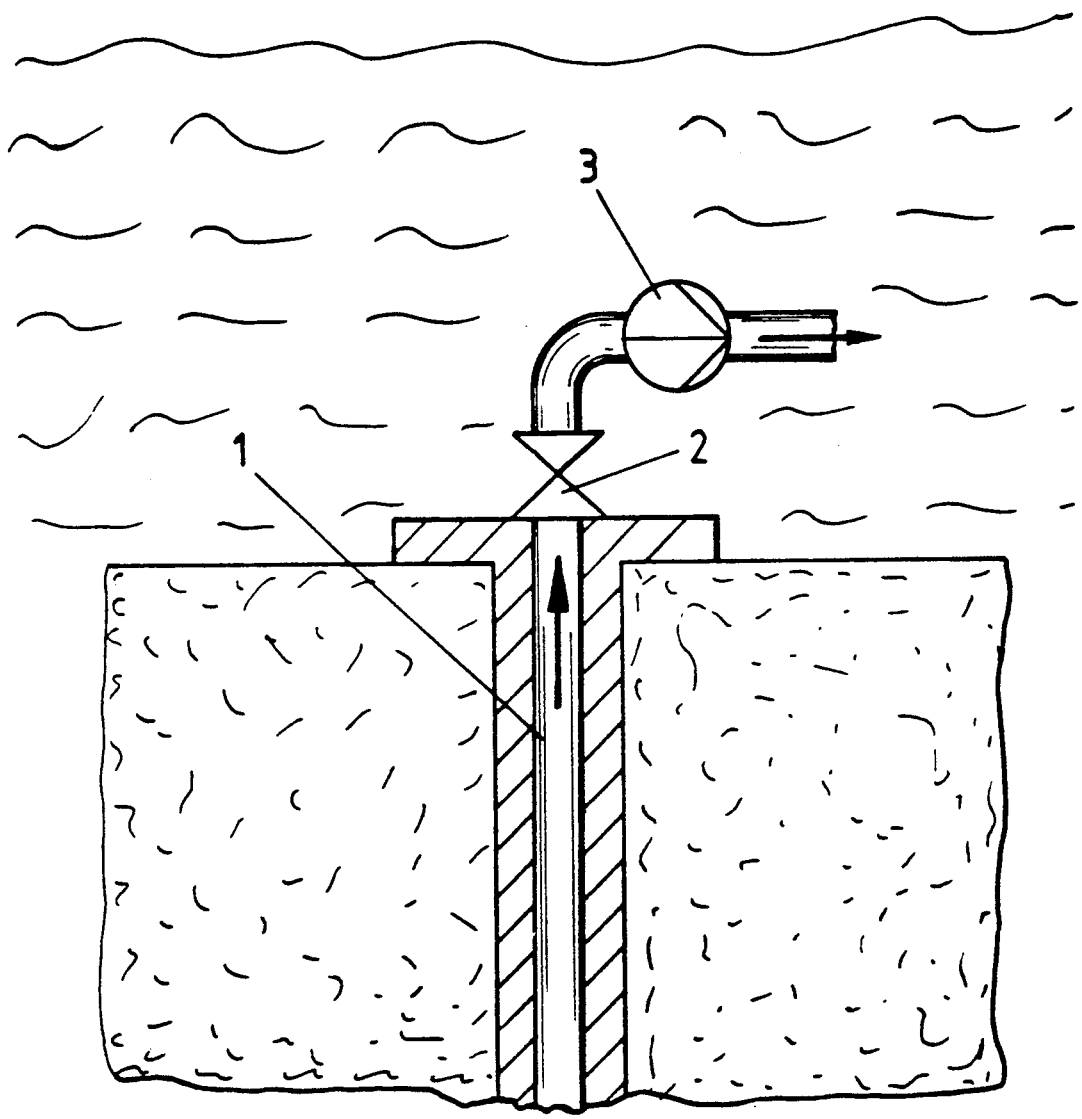
FIG. 1 shows conventional petroleum production with "multiphase flow".

The equipment shown in FIG. 1 may be from one aspect considered to be the simplest form of production from a well 1. The mixture produced by the well and consisting predominantly of petroleum and natural gas has to pass through a pressure reducing valve 2 before it reaches the pump 3. The separation into the petroleum and the natural gas as two components then takes place either in a platform above the level of the sea or on land. The pressure reducing valve 2 ensures that the load on the piping by the product is kept within permissible limits.

Figure 2:
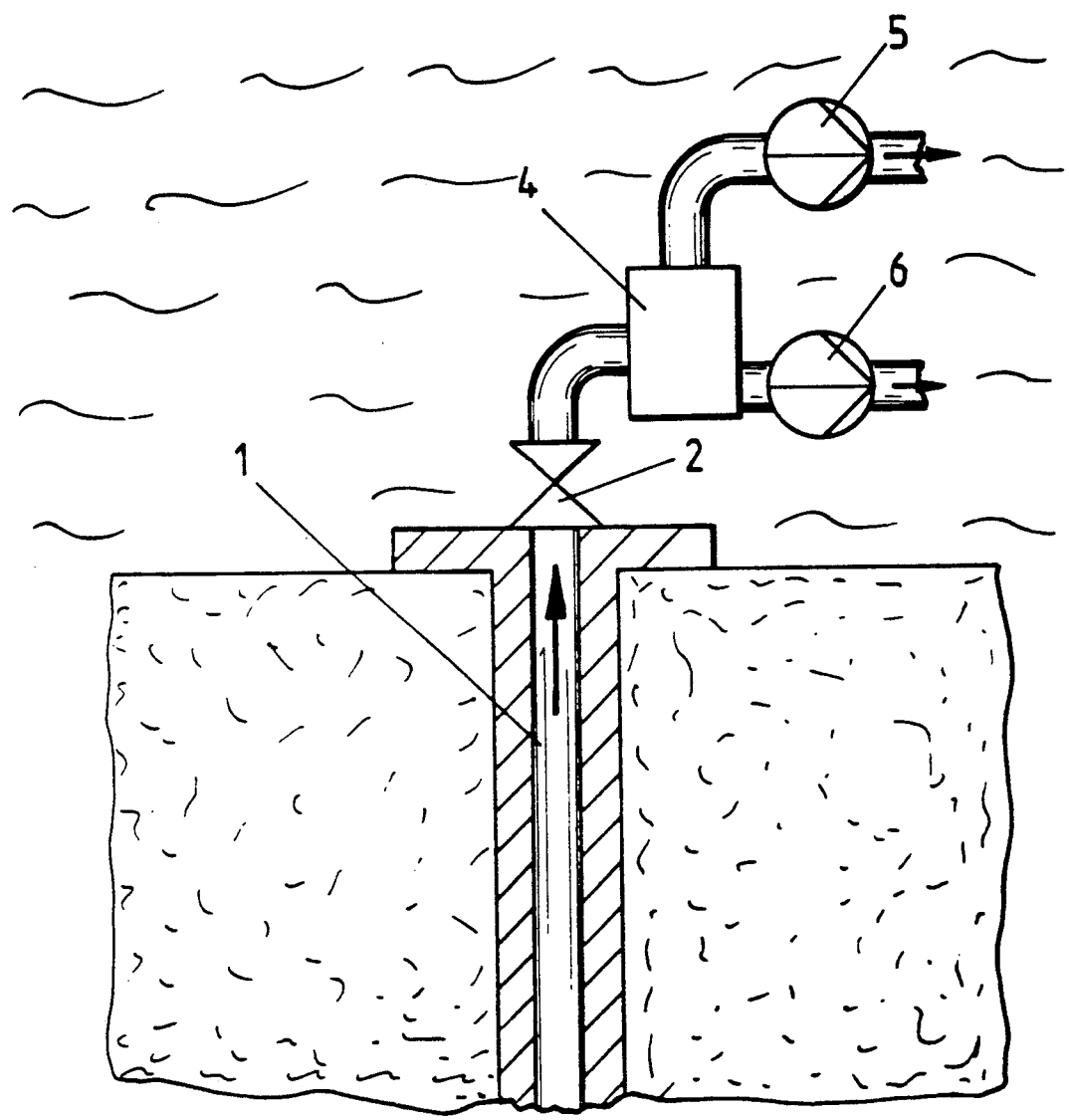
FIG. 2 shows conventional production with "single phase flow".

In the case of the conventional equipment shown in FIG. 2 there is a separation into oil and gas in the neighborhood of the well 1. For this purpose the product of the well is first reduced in pressure in a pressure reducing valve 2 to value which makes possible separation of the natural gas from the product in a separator 4. The gas released from the oil in the separator 4 is supplied by a compressor 5 to a platform on land, while the oil is put under pressure by a pump 6 as is necessary to convey it.

Figure 3:
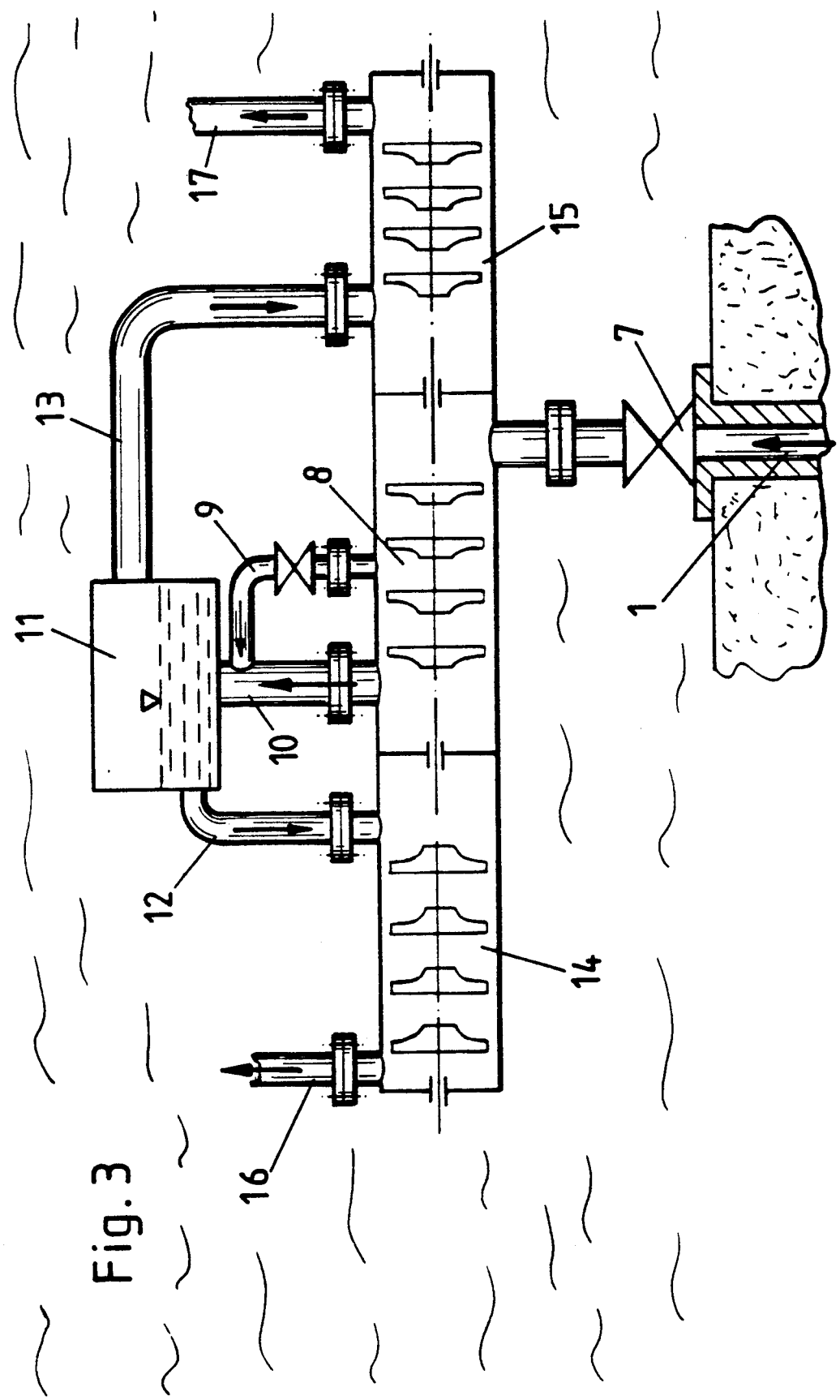
FIG. 3 shows equipment for performing the method of the invention with a prime mover and two driven machines.

The device in accordance with the invention shown in FIG. 3 is also placed downstream from a valve arranged on the well 1. This valve 7 is however a plain shutoff valve and does not serve to reduce pressure as is the case with the valves shown in FIGS. 1 and 2 in the conventional equipment. The reduction in pressure as required for separation into the components—gas and oil—is in this case performed by a prime mover 8 in the form of an energy recovery turbine (ERT) and which in the present working example is in the form of a centrifugal pump turning in reverse. In order to adapt the ERT 8 to varying parameters of the product there is a controlled removal port 9, which opens into the drain duct 10 of the ERT 8.

Via the drain duct 10 the product whose pressure has been reduced passes into a separating unit 11, whence the petroleum and the natural gas as the components pass via separate pipes 12 and 13 to the driven machinery for pumping the product. The driven machines are connected with the same shaft as the prime movers and are driven by same. Thus the petroleum is conveyed by a centrifugal pump 14 and the natural gas is conveyed by a compressor 15 via pipes 16 and 17 to a station on land.

Figure 4:
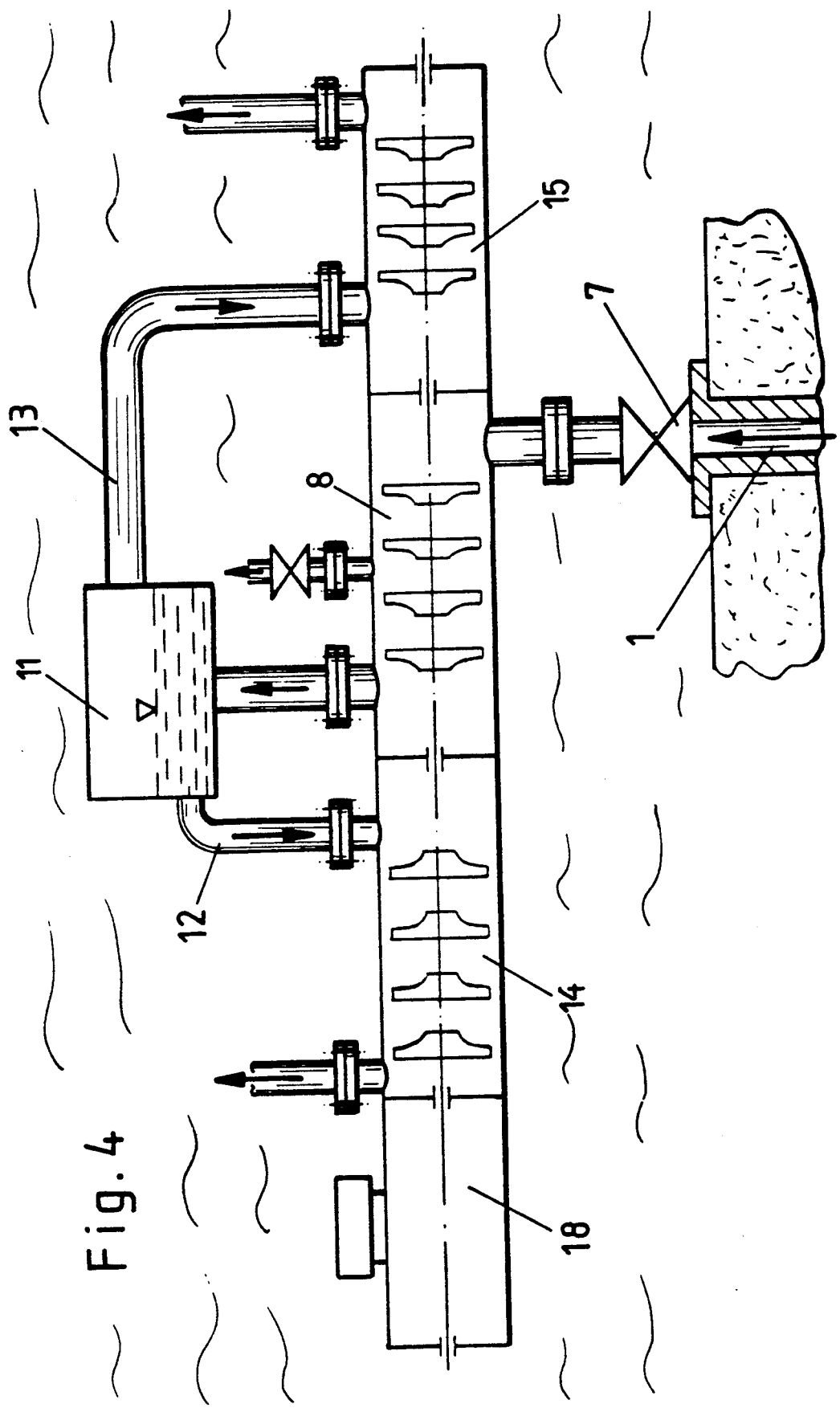
FIG. 4 is a view of equipment similar to that shown in FIG. 3 with an additional electric motor for driving the driven machines.

The equipment shown in FIG. 4 is generally similar to the equipment of FIG. 3 but it does additionally have an electric motor 18 which if the pressure of the product is insufficient, supplies the power necessary for driving the driven machines 14 and 15. Such an electric motor 18 obviously has to be provided for those wells whose underground pressure is not sufficient at the commencement of production to supply the power needed for driving the driven machines. It may however also be installed as a precaution in the case of oilfields where a drop in pressure appears likely during the later course of production. Since the electric motor 18 only has to supply additional power, it may be relatively small in size and the cable for the supply of electricity to it will be relatively thin. In the case of the provision of the electric motor 18 as a precautionary measure, that is to say in the case of the electric motor 18 being driven by the ERT 8, the electric motor 18 may be considered as a regular source of electricity, i.e. as a generator. The electrical energy then produced may be used for other purposes.

Figure 5:
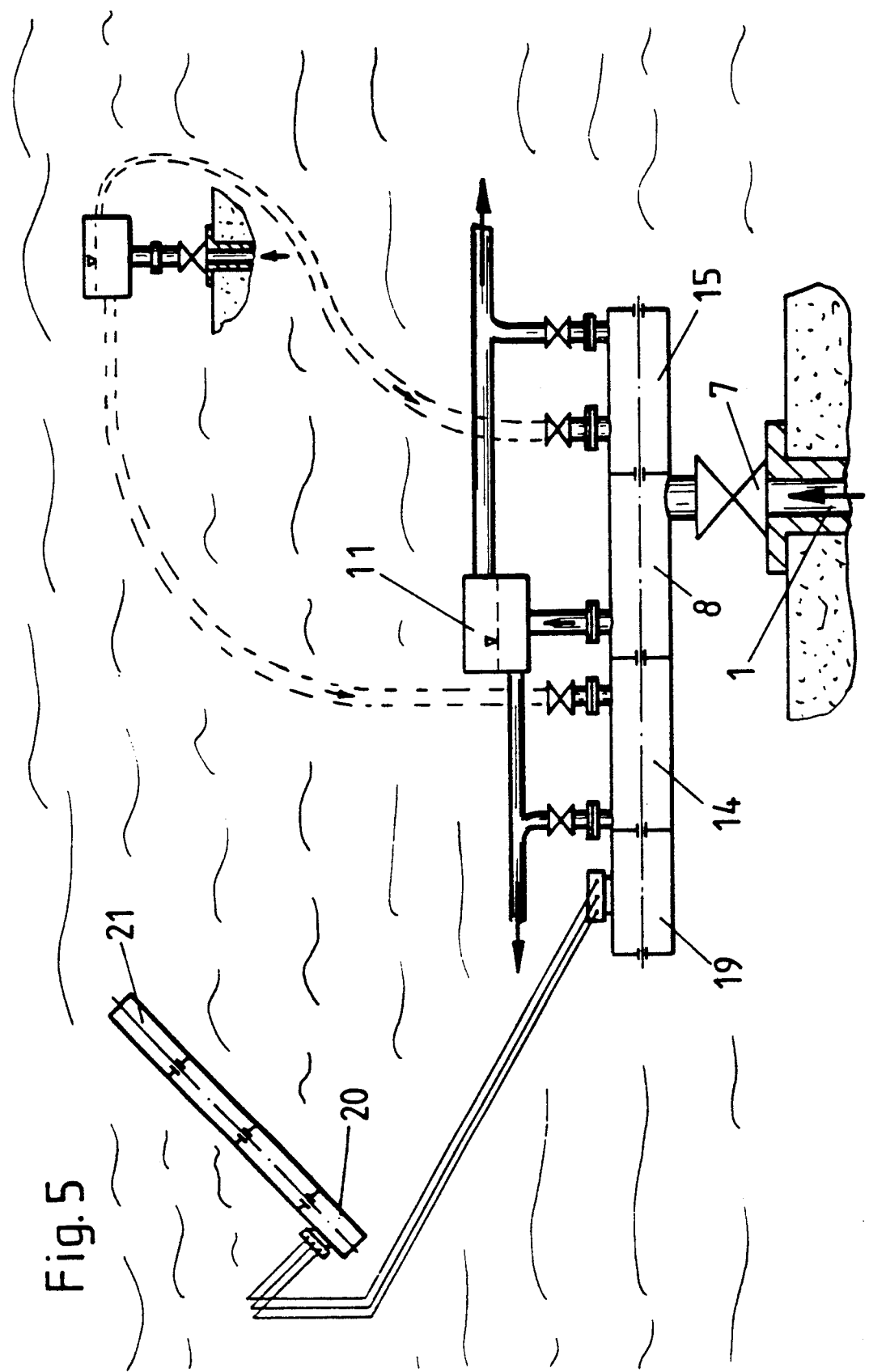
FIG. 5 shows equipment similar to that of FIG. 3 which in addition includes a generator serving to produce electrical power for remote units.

FIG. 5 shows equipment in accordance with the invention in which the generator 19 driven by the ERT 8 supplies electrical power to an electric motor 20 in a further unit 21 designed in accordance with the invention. This unit 21 is the same as the device shown in FIG. 4. Such a compound system avoids the necessity for complicated cable systems between the platform and the coast.

The design in accordance with FIG. 6 also employs an ERT 8 and a pump 14 but makes do without a compressor for conveying the natural gas from the separator 11. In this case the multiphase product coming from the well has its pressure reduced in the ERT 8 to a value which is still sufficiently high to convey the natural gas without auxiliary means to a platform or to a land station.

The equipment shown in the working examples of the invention may obviously be adapted for other particular applications. Thus for instance a first reduction in pressure for the recovery of energy may take place at the well and a second reduction in pressure directly prior to separation of the product into its components may take place on the production platform. Although it is an advantage to arrange the equipment in accordance with the invention adjacent to the well, this does not have to be the case. Generally, the equipment in accordance with the invention may be provided on the platform or on land.

I claim:

1. An installation for the recovery of petroleum from a well, comprising a turbine having an inlet, an outlet and an expansion chamber between said inlet and said outlet; first connecting means connecting the well with said inlet in such a manner as to prevent significant pressure reduction of the petroleum upstream of said chamber; means for separating the petroleum into a nongaseous flowable component and a gaseous component; second connecting means connecting said separating means with said outlet; means for conveying the components from said separating means to at least one location remote from the well and including at least one driven conveying device; and means coupling said turbine to said one conveying device so that said turbine can drive said one conveying device in response to pressure reduction of the petroleum in said chamber.

2. The installation of claim 1, further comprising a generator, said coupling means including means which couple said turbine to said generator in such a manner that said turbine can drive said generator in response to pressure reduction of the petroleum in said chamber.

3. The installation of claim 1, wherein said turbine comprises a reversible centrifugal pump.

4. The installation of claim 1, wherein said coupling means comprises a common shaft for said turbine and said one conveying device.

5. The installation of claim 4, further comprising an electric motor or generator unit mounted on said shaft.

6. The installation of claim 1, wherein said turbine has a plurality of stages including a final stage and said outlet is provided at said final stage, said turbine having an additional outlet at another of said stages; and further comprising third connecting means connecting said additional outlet with said second connecting means.

7. The installation of claim 6, wherein said third connecting means comprises a valve.

8. The installation of claim 7, wherein said valve is adjustable.

9. The installation of claim 1, further comprising a generator and an electric conductor extending from said generator to a location remote from the well, said coupling means including means which couples said turbine to said generator in such a manner that said turbine can drive said generator in response to pressure reduction of the petroleum in said chamber.

10. The installation of claim 9, further comprising an additional driven conveying device at another petroleum well for conveying a petroleum component away from the other well, said conductor being connected to said additional conveying device.

11. A method of recovering petroleum from a well, comprising the steps of withdrawing a stream of the petroleum from the well; subjecting said stream to a pressure reduction; separating said stream into a nongaseous flowable component and a gaseous component subsequent to said pressure reduction; and conveying at least one of said components from the well using at least a portion of the energy derived from said pressure reduction.

12. The method of claim 11, further comprising the step of generating electricity from said energy.

13. The method of claim 12, further comprising the step of transmitting said electricity to a location remote from the well.

14. The method of claim 12, further comprising the step of recovering petroleum from another well using said electricity.

* * * * *